United States Patent [19]

Kleemann et al.

[11] Patent Number: 4,786,100
[45] Date of Patent: Nov. 22, 1988

[54] VEHICLE SIDE DOOR

[75] Inventors: Wolfgang Kleemann, Starnberg; Bernd Woite, Munich; Ludwig Bolte, Kirchheim; Franz Guertler, Unterschleissheim, all of Fed. Rep. of Germany

[73] Assignee: Bayerische Motoren Werke Aktiengesellschaft, Munich, Fed. Rep. of Germany

[21] Appl. No.: 46,688

[22] Filed: May 7, 1987

[30] Foreign Application Priority Data

May 7, 1986 [DE] Fed. Rep. of Germany ....... 3615436

[51] Int. Cl.⁴ .............................................. B60J 5/04
[52] U.S. Cl. ..................... 296/146; 296/153; 296/35.2; 267/153; 267/292
[58] Field of Search ............... 296/146, 65 A, 67, 153, 296/35.2, 188, 189; 293/128; 267/140.2, 140.3, 153, 292

[56] References Cited

U.S. PATENT DOCUMENTS

| 3,791,693 | 2/1974 | Hellriegel et al. ............. 293/128 X |
| 3,907,358 | 9/1975 | Barenyi et al. ................. 296/202 X |
| 3,936,090 | 2/1976 | Aya et al. ........................... 296/146 |
| 3,989,275 | 11/1976 | Finch et al. ..................... 188/371 X |
| 4,272,103 | 6/1981 | Schmid et al. ................... 296/189 X |
| 4,369,608 | 1/1983 | Miura et al. ..................... 296/146 X |
| 4,662,649 | 5/1987 | Ikeda et al. ........................ 296/70 X |
| 4,667,979 | 5/1987 | Wolff .................................. 296/70 X |

FOREIGN PATENT DOCUMENTS

| 2127724 | 12/1972 | Fed. Rep. of Germany . |
| 1755057 | 2/1974 | Fed. Rep. of Germany . |
| 2409619 | 9/1974 | Fed. Rep. of Germany . |
| 2426705 | 12/1975 | Fed. Rep. of Germany . |
| 3425777 | 1/1986 | Fed. Rep. of Germany ...... 296/146 |
| 7813066 | 5/1982 | France . |
| 0055020 | 4/1980 | Japan ................................... 296/146 |
| 1372752 | 11/1974 | United Kingdom ................ 296/146 |

Primary Examiner—Robert B. Reeves
Assistant Examiner—Russell D. Stormer
Attorney, Agent, or Firm—Barnes & Thornburg

[57] ABSTRACT

A vehicle door whose inside is deformable under energy dissipation. The inside is thereby subdivided into different sections matched in its rigidity to the individual body regions of the passenger. Furthermore, the rigidity can increase toward the rear door frame so that taller vehicle passengers find altogether a more rigid door inside when the seat is displaced toward the rear. The vehicle door is to reduce the injury risks in case of a lateral impact.

14 Claims, 1 Drawing Sheet

VEHICLE SIDE DOOR

BACKGROUND AND SUMMARY OF THE INVENTION

The present invention relates to a vehicle side door, especially for passenger motor vehicles, wherein the inside are of the door facing a vehicle seat, is deformably constructed, at least section-wise deformable under energy dissipation in case of impact of the body of a passenger seated on the vehicle seat.

In case of an automobile accident, the lateral impact is particularly critical for the passengers. If the accident occurs from the side the impact force member of the other vehicle penetrates into the door and displaces very rigid and stiff built-in parts such as door-opening mechanisms and window lifter mechanisms. On the other hand, the vehicle passenger impacts against the inside of the door as a result of the acceleration of the impact and can thereby be injured considerably by penetrating components and structural parts. For this reason, vehicle doors are padded along their inside. However, the padding of present-day vehicles is capable of absorbing only small forces and does not significantly reduce the injury risk.

The DE-OS No. 2 409 619, which goes one step further, provides an embedded deformation member on the inside of the door within the area of the window railing. This deformation member is capable of dissipating the energy from the impacting vehicle to the passenger and reduce the acceleration values of his or her body. However, the construction of this prior art is effective only within the chest area of the vehicle passenger whereas the remaining body regions are exposed as heretofore to the increased injury risk.

By reason of its anatomy, the human body has regions of differing strength. Thus, the strong pelvis bones are able to absorb considerably larger forces without fracture than, for example, the chest area. In this regard, the abdominal or stomach area in which body organs are located without any significant skeleton or bone protection is particularly weak.

The present day padding of insides of vehicle doors does not take into consideration these peculiarities because the padding is constructed essentially with the same rigidity over the entire surface. Furthermore, the deformation member according to the aforementioned prior art does not take into consideration the different resistance capability of the individual body regions. As already mentioned, it is effective exclusively within the chest area.

It is the object of the present invention to so construct a vehicle door that has a deformable member that is better matched to the anatomy of the human body.

The underlying problems are solved according to the present invention in that the rigidity of the energy-dissipating sections is matched to the differing resistance of the individual body regions of the vehicle passenger adjacent these sections and has lower values within the abdominal region of the vehicle passenger and higher values within the pelvis and chest regions.

The inside, which serves as padding, includes in the vehicle door according to the present invention essentially three deformable sections with differing rigidity. In the first and lower section which is disposed adjacent the pelvis of the vehicle passenger, the greatest rigidity is provided. The upper section disposed closest to the chest area of the vehicle passenger has a lesser rigidity. Finally, the center area of the vehicle door inside is constructed particularly soft in order to be able to catch and absorb the abdominal area of the vehicle passenger.

In an appropriate construction, the present invention also takes into consideration the fact that tall vehicle passengers as drivers displace the seat further toward the rear as compared to short vehicle passengers. Additionally, the present invention starts in general with the fact that tall vehicle passengers have a greater mass and therewith are thrown with a greater force against rear inside portion of the door in case of a lateral impact. The invention takes this into consideration in that the deformable sections increase in their rigidity in the direction toward the rear door edge.

It has proven as particularly advantageous to construct the inside of the door as a structural deformation plate. This deformation plate is provided with a cover foil serving as an inner door covering. The cover foil and the deformation plate may thereby be constructed as one-piece or as an integrated molded part. In this case, the structural unit can be manufactured in a particularly simple manner as a synthetic plastic foam part.

However, it may also be appropriate to construct the deformation plate as a separate structural part which can be manufactured, for example, as a synthetic plastic part by the blow-molding process. If one selects this manufacturing process, the possibility exists to mold in one operation the deformation plate both for the left as also for the right vehicle door as the plates will be configured the same.

Apart from the individual manufacturing possibilities, the molded part, depending on requirements, may be constructed of all known suitable materials such as thermoplastic material, aluminum, resins reinforced with carbon and polyamide fibers, etc.

Appropriately, the deformation plate has a hollow chamber structure whose hollow chamber cross sections can be constructed rectangular, circular, eliptical, triangular, diamond-shaped, etc. The shape of the hollow body cross section depends on the involved requirements. By the use of a hollow chamber structure, the needed rigidities can be determined and watched by way of the apertures. The force-displacement behavior of hollow chamber structures is thereby equal to a constant characteristic whereby an optimum energy absorption is assured over a large deformation path. In contrast to a fully foamed-out padding, the hollow chamber structures come into energy absorbing effect only in case of very large deformation degrees. Furthermore, the hollow chamber structure can be constructed lighter and less expensively as compared to a full-foam construction. The hollow chambers provide space for the installed door components, such as window lifters, etc.

Finally, the deformation behavior of the door on the inside can be controlled even more accurately by defined intended buckling places in the individual chamber walls.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
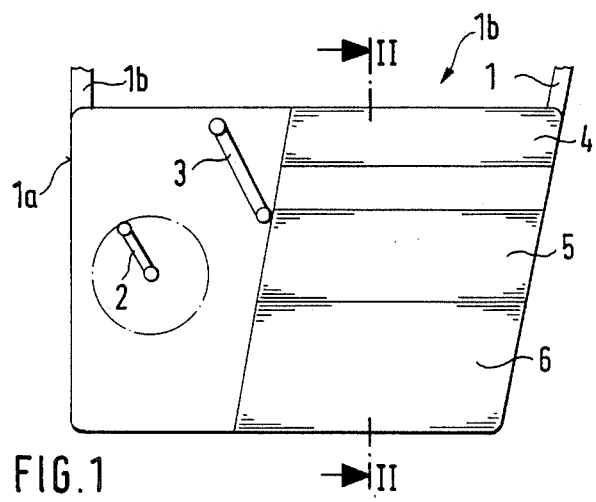
FIG. 1 is a somewhat schematic elevational view of a vehicle side door on the in accordance with the present invention, as viewed from the inside.

Referring now to the drawing wherein like reference numerals are used throughout the various views to designate like parts, the vehicle door illustrated schematically in FIG. 1 is to be a front side door 1a of a passenger motor vehicle (not shown). It is thereby pivotally connected with its forward door edge 1a by way of hinges (not shown) at the A-column of the vehicle body. Additionally, the vehicle door 1 which shows the inside thereof, also shows in part a window frame 1b.

The inside of the vehicle door is subdivided into a forward section adjacent the door edge 1a and a rear section. A crank 2 for raising and lowering the window and a handle for closing the door and holding-on is provided in the forward section of the door. The rear section of the door inside serves as padding and can be deformed under energy dissipation. It includes essentially three horizontally extending parallel sections 4, 5 and 6. These sections 4, 5 and 6 are thereby located adjacent a vehicle seat (not shown) and a person seated thereon. The section 6 is located at approximately the height of the pelvis region of the vehicle passenger, the section 5 within the region of the abdomen, and the section 4 finally within the region of the chest.

Figure 2:
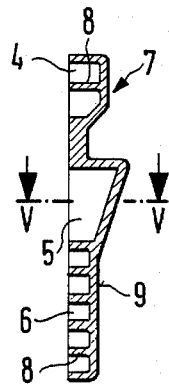
FIG. 2 is a cross-sectional view through the vehicle door, taken along line II—II of FIG. 1.

As shown in FIG. 2, this rear part of the vehicle door on the inside consists of a one-piece deformation plate generally designated by reference numeral 7 constructed as hollow chamber structure which has differing hollow chamber profiles for the individual sections 4, 5 and 6. The hollow chamber profile of the section 6 which is coordinated to the pelvis region of the vehicle passenger is thereby constructed most rigid. The rigidity of the section 4 for the chest area is slightly smaller in comparison therewith and finally the section 5 for the abdominal area has the least rigidity. The number of the cross webs 8 is to indicate thereby (FIG. 2) the degree of the respective rigidity. The deformation plate 7 includes a cover foil 9 in the direction toward the vehicle inside which provides a pleasing appearance.

Figure 5:
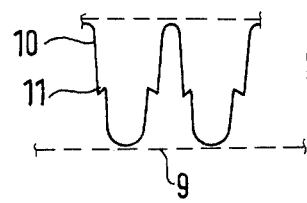
FIG. 5 is a schematic view of a support member in the hollow chamber structure with intended buckling places corresponding to the cross-sectional line V—V of FIG. 2.

According to FIG. 2 a continuous, uninterrupted hollow chamber can be seen within the area of the section 5. However, it is also possible, as shown in FIG. 5, to reinforce this hollow chamber by a wave-shaped or undulated support part 10 which with its wave troughs pointing toward the vehicle passenger. This support part 10 includes along its flanks intended buckling places 11 for the purpose of a defined deformation behavior.

Figure 3:
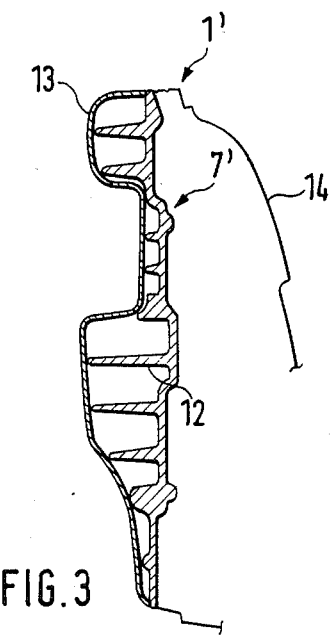
FIG. 3 is a cross-sectional view, similar to FIG. 2, of a modified embodiment of a vehicle door in accordance with the present invention, on an enlarged scale.

The inside of the vehicle door 1' according to FIG. 3, of which an outer door sheet metal body panel 14 is also indicated section-wise, has a somewhat different construction. First, the lesser rigidity in the abdominal area is made possible by long, easily deformable cross webs 12. Furthermore, the support plate generally designated by reference numeral 7' is constructed as a separate structural part on which subsequently an inner door covering 13 is secured. With this construction, however, attention must be paid that the inner door covering 13 has a sufficient rigidity in order to prevent the webs 12 from piercing through the same before they break off. Such a deformation plate 7 enables a material selection independent of the covering 13. Additionally, it permits a greater freedom in the selection of its manufacturing process.

Figure 4:
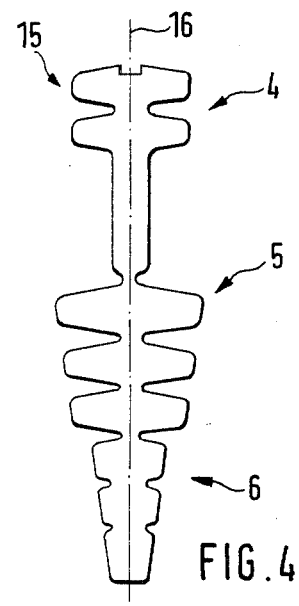
FIG. 4 is a schematic view of a unitary construction of a deformation plate in accordance with the present invention for the left and right vehicle door.

This is indicated in FIG. 4. In this figure, a molded body 15 of synthetic plastic material can be seen which is constructed symmetrically along the axis 16 and includes a deformation plate for the left door and a deformation plate for the right door. This molded body 15 is made by a blow-molding process, and by subsequent separation along the line 16 the two deformation plates are obtained. In this manner, the deformation plates can be manufactured in a particularly favorable manner.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A vehicle side door having inside energy dissipating section means facing a vehicle seat and constructed to be variably deformable along its height under energy dissipation in case of an impact of a body of a passenger seated on the vehicle seat, wherein the the energy dissipation sections means has portions with varying rigidity and wherein the rigidity of these portions is matched to differing resistance capabilities of individual adjacent body regions of a vehicle passenger to safely accept an impact and has smaller rigidity values in the area located adjacent where an abdominal area of a vehicle passenger sitting on the seat would be located than in the area adjacent where the pelvis and chest area would be located.

2. A vehicle door according to claim 1, wherein said vehicle seat is adjustable in the vehicle longitudinal direction and wherein there are differing rigidity values of the energy dissipating means inside of the door, which increase in value in the direction toward the rear edge of the door.

3. A vehicle door according to claim 2, wherein the inside of the vehicle door is constructed as a structural deformation plate means covered with a cover foil.

4. A vehicle door according to claim 3, wherein the inside of the vehicle door is an integrated molded part.

5. A vehicle door according to claim 3, wherein the deformation plate means and cover are provided as a unitary structural part.

6. A vehicle door according to claim 4, wherein the deformation plate means has a hollow chamber structure.

7. A vehicle door according to claim 6, wherein the hollow chamber structure includes support means with defined intentional breaking places.

8. A vehicle door according to claim 1, wherein the door is the side door of a passenger motor vehicle.

9. A vehicle door according to claim 1, wherein the inside of the vehicle door is constructed as a structural deformation plate means covered with a cover foil.

10. A vehicle door according to claim 9, wherein the inside is formed by an integrated molded part.

11. A vehicle door according to claim 9, wherein the deformation plate means and cover are provided as a unitary structural part.

12. A vehicle door according to claim 3, wherein the deformation plate means has a hollow chamber structure.

13. A vehicle door according to claim 12, wherein the hollow chamber structure includes support means with defined intentional breaking places.

14. A vehicle door according to claim 13, wherein the deformation plate means and cover are provided as a unitary structural part.

* * * * *